US008432157B2

(12) United States Patent
Fitch (10) Patent No.: US 8,432,157 B2
(45) Date of Patent: Apr. 30, 2013

(54) INDUCTIVE PROXIMITY SENSOR WITH ACTIVE CIRCUIT TO CANCEL STRAY FIELDS

(75) Inventor: John Kenneth Fitch, Westford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 394 days.

(21) Appl. No.: 12/895,099

(22) Filed: Sep. 30, 2010

(65) Prior Publication Data

US 2012/0081107 A1   Apr. 5, 2012

(51) Int. Cl.
*G01B 7/14* (2006.01)
(52) U.S. Cl.
USPC .................................................. 324/207.15
(58) Field of Classification Search ............... 324/207.15
See application file for complete search history.

(56) References Cited

U.S. PATENT DOCUMENTS

| | | | |
|---|---|---|---|
| 2,235,019 A | 3/1941 | Johannson | |
| 3,296,553 A | 1/1967 | Reid | |
| 3,805,185 A | 4/1974 | Kishi | |
| 4,241,317 A | 12/1980 | Breitling | |
| 4,270,102 A | 5/1981 | Gawler et al. | |
| 4,305,034 A | 12/1981 | Long et al. | |
| 4,509,023 A | 4/1985 | Heimlicher | |
| 4,509,032 A | 4/1985 | Post | |
| 4,638,262 A | 1/1987 | Miyamoto | |
| 4,942,372 A | 7/1990 | Heimlicher | |
| 5,264,733 A | 11/1993 | Tigges | |
| 5,278,523 A | 1/1994 | Kriz | |
| 5,942,372 A | 8/1999 | West et al. | |
| 7,030,626 B2 | 4/2006 | Hayashi et al. | |

FOREIGN PATENT DOCUMENTS

| | | |
|---|---|---|
| DE | 3513403 | 10/1986 |
| JP | 5-063559 | 3/1993 |

*Primary Examiner* — Bot Ledynh
(74) *Attorney, Agent, or Firm* — William R. Walbrun; Turocy & Watson, LLP; John M. Miller (57) ABSTRACT

Systems and/or methods are provided for cancelling stray magnetic fields escaping out the back or sides of an inductive proximity sensor. The inductive proximity sensor includes a coil assembly with a sensing coil. The sensing coil detects magnetic flux escaping out the sides and/or back of the sensor. An active circuit couples to the sensing coil. The active circuit generates a canceling current based upon a current and/or electromotive force in the sensing coil due to the flux. The cancelling current drives a driven coil to generate a magnetic field which can reduce total flux through the sensing coil to zero.

20 Claims, 7 Drawing Sheets

INDUCTIVE PROXIMITY SENSOR WITH ACTIVE CIRCUIT TO CANCEL STRAY FIELDS

TECHNICAL FIELD

The subject disclosure relates to inductive proximity sensors and, more particular, to an inductive proximity coupled with an active circuit to cancel stray fields, thus allowing the inductive proximity sensor to be insensitive to mounting geometry.

BACKGROUND

Inductive proximity sensors can be employed to provide non-contact detection of an object or target. Such sensors can be utilized for a variety of sensing functions in connection with industrial plants and/or machinery. For instance, inductive proximity sensors can be employed in connection with material handling systems, robot systems, assembly systems and machines, etc. An inductive proximity sensor can emit an output signal when a target enters into a sensing area. Typically, the target is a metallic object such as a ferrous material (e.g., iron, steel, etc.) or other metallic materials (e.g., copper, nickel chromium, brass, aluminum, etc.).

A typical inductive proximity sensor operates by generating a magnetic field from a detection face. When a target moves into the magnetic field, eddy currents swell in the target. The eddy currents, in turn, generate a magnetic field, which interacts with the magnetic field generated by the sensor. In particular, the magnetic field generated by the eddy currents operates to dampen the magnetic field generated by the sensor. The sensor detects the dampening of the magnetic field and triggers and output signal which indicates that the target is in proximity to the sensor location.

Inductive proximity sensors generate stray fields or magnetic flux out the back, the sides, and/or any other direction away from a sensing face of the sensor. In some cases, stray fields can be reduced, but not eliminated, with shielding. The stray field renders the inductive proximity sensors sensitive to metal behind and/or to the sides of the sensors, including mounting means. Interactions with ancillary metal reduce sensitivity and sensing distance of inductive proximity sensors. One way to combat loss of sensitivity is to engineer sensors, which are to be mounted in a particular manner. However, even when mounted according to the intended configuration, surrounding metal continues to affect the sensor and ultimately impacts a maximum achievable sensitivity and temperature stability.

Further, two of the largest sources of undesired damping in unmounted sensors are resistance of the coil winding and damping due to metal housing of the sensor. Numerous techniques have been devised to ameliorate effects of coil resistance, but little has been devised in regard to reducing damping due to housing.

Housings are commonly composed of inexpensive brass, with a resistance ranging from about 7 to 15 times that of copper, depending on a percentage of zinc in the brass. In an example, alloys optimized for mechanical strength have the highest resistance. Stainless steel (resistance approximately 27 times copper) is also employed for housings when requirements justify the cost (e.g., corrosion and chemical resistance requirements). Copper is rarely utilized for housings due to cost and low mechanical strength. The damping due to the housing varies in proportion to the respective resistivity of copper, brass, and stainless steel. Higher resistivity causes higher damping.

However, when a sensor is mounted, damping due to mounting and other surrounding metal may exceed the other sources of damping (e.g., coil resistance, housing, etc.). This effect intensifies as the mounting surface approaches a forward-most edge of the sensor's metallic housing, corresponding to the face of the sensor for shielded sensors and the rear of the plastic front end-cap for unshielded sensors.

"Shielded" sensors have metallic housings extending to the front face and may be mounted with the sensor's face up to and/or flush with the front mounting surface. "Unshielded" sensors have a metallic housing typically extending to within the range of 10 mm to 20 mm of the front sensor surface for a 30 mm tubular sensor, for example, where 30 mm denotes a size of a hole for mounting and not an actual outer diameter of the sensor.

Unshielded sensors exhibit greater sensitivity because (1) the magnetic field emanating from the sides of the sensor results in a greater magnetic flux density farther from the sensor face than for shielded sensors, and (2) unshielded sensors can be mounted with the mounting plane farther from the sensors' face, thus reducing the undesired damping. However, even in unshielded sensors, stray flux from the rear of the pot core interacts with the metallic housing.

One technique, to reduce undesired damping due to the housing, is to place a copper band, internal to the sensor and around the pot core, to shield the pot core from the housing. The current generated in the band reduces an amount of magnetic flux that reaches the brass or stainless steel housing. The damping is not reduced to zero and additional clearance may be necessary between the housing and the pot core to accommodate the band. Also, a copper disk or ring placed behind the pot core will similarly reduce stray flux from the rear.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

Systems and/or methods are disclosed for cancelling stray magnetic fields escaping out the back or sides of an inductive proximity sensor. In an aspect, the inductive proximity sensor includes a coil assembly with a sensing coil. The sensing coil can be located around the outside of a pot core of the inductive proximity sensor. The sensing coil detects flux (e.g., stray fields) escaping out the sides and/or back of the sensor. When the flux passes through the coil, an electromotive force is generated in the sensing coil which can drive an electric current. An active circuit couples to the sensing coil. The active circuit generates a canceling current based upon the electric current and/or electromotive force in the sensing coil. The cancelling current is generated in a driven coil also located around the outside of the pot core. The driven coil, when the cancelling current is applied, generates a magnetic field which can reduce total flux through the sensing coil to zero.

The coil assembly with active circuit can be more effective than passive techniques (e.g., copper bands encircling the pot core and/or behind the pot core) since the active circuitry can reduce effective resistance of the coil assembly close to zero. This leads to more effective blockage of stray flux since the negligible effective resistance imposes negligible damping on the sensor as compared to passive elements.

In another aspect, the inductive proximity sensor can include a multiplicity of coil assemblies. The multiplicity or plurality of coil assemblies can be individually coupled to active circuits. The multiplicity of coil assemblies can be located at distinct locations around the pot core of the sensor.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Systems and/or methods are presented that provide for cancelling stray magnetic fields escaping out the back or sides of an inductive proximity sensor. The inductive proximity sensor includes a coil assembly with a sensing coil. The sensing coil detects magnetic flux escaping out the sides and/or back of the sensor. An active circuit couples to the sensing coil. The active circuit generates a canceling current based upon a current and/or electromotive force in the sensing coil due to the flux. The cancelling current drives a driven coil to generate a magnetic field which can reduce total flux through the sensing coil to zero.

Various embodiments are now described with reference to the drawings, wherein like reference numerals are used to refer to like elements throughout. In the following description, for purposes of explanation, numerous specific details are set forth in order to provide a thorough understanding of one or more embodiments. It will be evident, however, that such embodiment(s) can be practiced without these specific details. In other instances, well-known structures and devices are shown in block diagram form in order to facilitate describing one or more embodiments.

Figure 1:
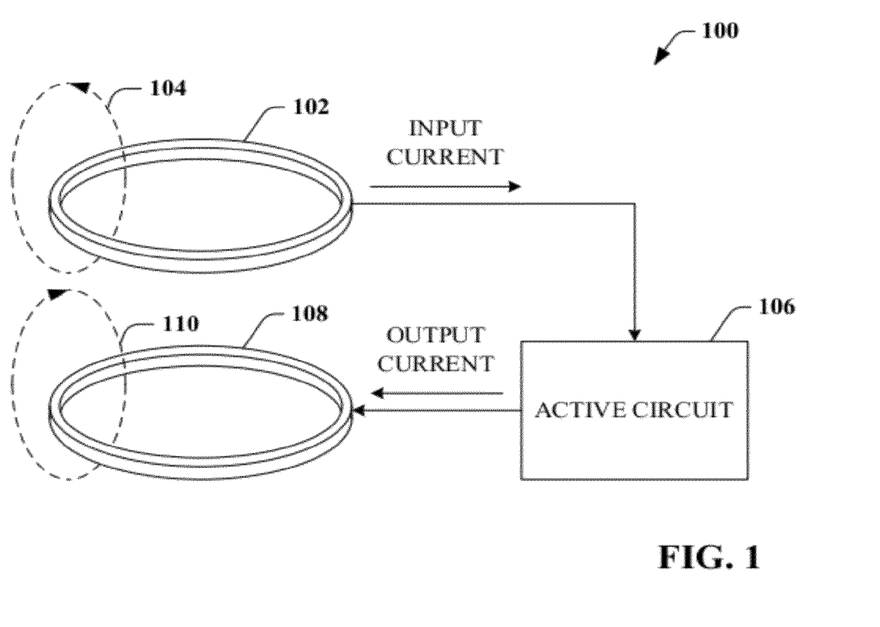
FIG. 1 illustrates a high-level block diagram of a coil assembly and active circuit configured to reduce stray magnetic fields of an inductive proximity sensor in accordance with various aspects.

Referring initially to FIG. 1, illustrated is a system 100 including a coil assembly and active circuit configured to reduce stray magnetic fields of an inductive proximity sensor in accordance with various aspects. Stray magnetic fields, if left unchecked, can reduce sensitivity to target of the inductive proximity sensor. A voltage electromotive force generated around any closed loop is equal to a rate of change of total magnetic flux encircling the loop. This principle is conventionally depicted as a loop (e.g., an integration path), within a plane, wherein the magnetic flux encircling the loop is integrated on the surface of the plane defined by the loop. However, more generally, it is to be appreciated that the loop need not fall with a plane and the surface integral of total magnetic flux need not be performed on a planar surface. For instance, a surface, on which an integral is performed, can resemble a blown-up balloon and the loop can be a small band encircling the neck of the balloon. When this principle is applied to the core of the inductive proximity sensor, undesirable stray flux, emanating from the core, passes out the sides or rear of the core and returns via the front of the core. When a loop is created, encircling the core and in contact with the core, the undesirable stray flux must encircle the loop. The flux, encircling the loop, generates a net electromotive force in the loop.

In transformers, a copper foil, typically referred to a belly band, can be wrapped around the transformers to reduce leakage or stray flux, which can generate interference in nearby circuitry and/or facilitate meeting emission requirements. Although the copper foil has a non-zero resistance, the belly band provides a reduction in the magnitude of the leakage flux. However, the inductive proximity sensor is not a closed magnetic path or circuit as is the case with transformers. Mounting surfaces surrounding the inductive proximity sensor can reduce stray flux, but not eliminate stray flux. The power dissipated due to resistance of the encircling mounting plane constitutes a load similar to a sensed target.

To illustrate further, the inductive proximity sensor can detect a target by measuring power loss of a tank circuit driving the core of the sensor. The tank circuit, in an example, can be a resonant circuit (e.g., an LC circuit) that includes an inductor and a capacitor. Associated with the tank circuit is a value, Q, which, in the case of inductor proximity sensors, equates to sensitivity to target. In an aspect, the inverse of Q (or sensitivity to target) is damping of the tank circuit. As a target approaches the sensor, eddy currents can build in the target due to the magnetic field produced by the sensor. The eddy currents generate an opposing field which operates to dampen the magnetic field of the sensor. Damping the magnetic field of the sensor places a load on the tank circuit creating a loss in power. The loss of power or damping of the tank circuit can be measured and analyzed to determine detection of the target by the sensor.

As stated above, the resistance of mounting surfaces around the sensor similarly loads the tank circuit. To distinguish a target from mounting surfaces, an effect of mounting surfaces is taken into account when engineering and/or calibrating a sensing threshold of the sensor, thus reducing sensitivity and/or sensing distance of the sensor. Further, the power dissipated from the mounting surface varies with temperature as the resistivity of the mounting surface changes with temperature. Accordingly, the undesired power loss as well as uncompensated resistivity variations due to temperature places an ultimate limit on sensitivity and sensing distance, with respect to a target, of the sensor.

In an example, a ring made from a superconducting material can be employed to reduce sensitivity constraints generated by stray flux interacting with mounting surfaces or other non-target metal. The ring can be placed around a pot core of a sensor. As a superconductor, it is difficult to force flux through the ring since an infinite current can flow to cancel any flux. Thus, stray flux from the pot core generates a current in the superconducting ring, wherein the current operates to cancel the stray flux. Moreover, as a superconductor, the ring dissipates zero power and, thus, does not load the tank circuit of the sensor. With such a configuration, mounting surfaces and/or other non-target metal to the sides of or behind the pot core will not reduce sensitivity to target as the ring cancels any stray fields which would react with the mounting surfaces or non-target metal.

In accordance with an aspect, an active circuit and coil assembly can be employed to simulate the effect of the superconducting ring. As shown in FIG. 1, a stray magnetic field flux 104 encircles sensing coil 102. The stray magnetic flux 104, by encircling sensing coil 102, generates a net electromotive force in sensing coil 102. The net electromotive force can generate a current when sensing coil 102 is coupled to a circuit, such as active circuit 106. Active circuit 106 receives the current as an input current, and generates an output current based upon the input current. The output current drives a driven coil 108. Driven coil 108, when the output current is applied, generates a magnetic field 110, which opposes stray magnetic flux 104, and cancels flux 104. Magnetic field 110 force total flux through sensing coil 102 to zero.

In an example, stray flux 104 can emanate from a pot core of an inductive proximity sensor. Sensing coil 102 can be fitted around the pot core of the sensor such that stray flux 104, escaping from the sides and/or back of the pot core, encircles sensing coil 102. Due to stray flux 104 escaping from the pot core, sensing coil 102 generates a net voltage electromotive force, which is supplied to active circuit 106. Active circuit 106 determines an output current and employs the output current to drive driven coil 108, which can also be fitted around the pot core of the sensor. The driven coil 108, when supplied with the output current, produces opposing magnetic field 110. Magnetic field 110 cancels stray flux 104. Thus, during operation of the sensor, system 100 reduces stray magnetic fields emanating from the sensor that can interact with surrounding non-target metal. The interactions can load the tank circuit of the sensor and, accordingly, reduce sensitivity and sensing distance with respect to a target. System 100, by eliminating stray flux, improves sensitivity and sensing distance of an inductive proximity sensor, regardless of mounting geometry or other non-target objects to the sides of or behind the sensor.

Active circuit 106 can be a circuit constructed with an operational amplifier, as described below. However, it is to be appreciated that active circuit 106 can be any suitable circuit, device, system, etc., which is capable of determining and producing an output current based upon an input current and/or electromotive force. Further, it is contemplated that the claims appended hereto are not limited to circuit comprising operational amplifiers as it is intended that the subject claims encompass alternative systems to generate currents that cancel stray flux.

Figure 2:
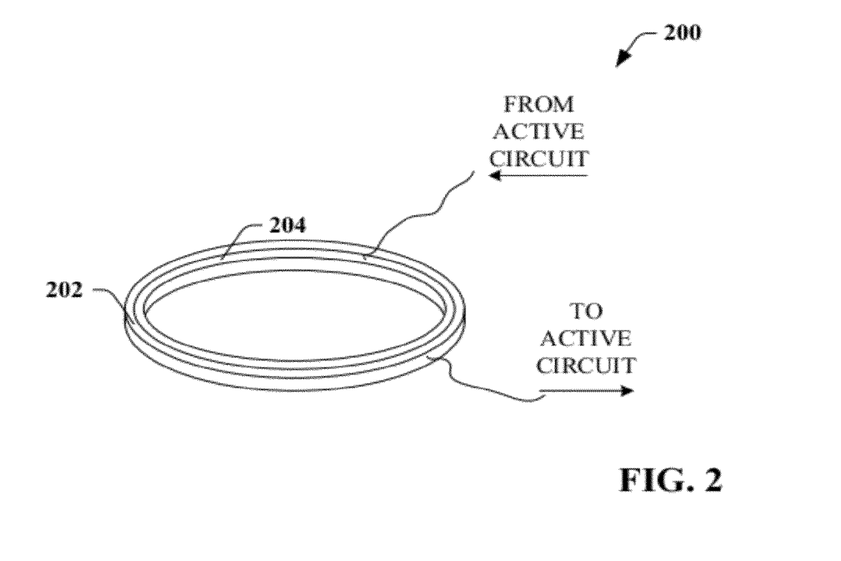
FIG. 2 illustrates an example coil assembly in accordance with various aspects.

In an aspect, sensing coil 102 and driven coil 108 can be distinct coils. For instance, sensing coil 102 and driven coil 108 can be separately wound and individually located as depicted in FIG. 1. In another aspect, the coil assembly described above can be configured according to a variety of configurations. FIG. 2 depicts a coil assembly 200 according to an alternative configuration. As shown in FIG. 2, coil assembly 200 can include a sensing coil 202 and a driven coil 204. Sensing coil 202 and driven coil 204 can be substantially similar to and perform similar functionality as sensing coil 102 and driven coil 108 described supra with respect to FIG. 1. Sensing coil 202 and driven coil 204 can be concentrically placed with respect to one another such that one coil wraps around the other coil. While FIG. 2 illustrates driven coil 204 on the inside concentric position, it is to be appreciated that the reverse orientation, wherein sensing coil 202 is within driven coil 204, can be employed. Sensing coil 202 can include a lead or connection that couples the sensing coil 202 to an active circuit, such as active circuit 106. The connection can convey, to the active circuit, an electromotive force and/or current in sensing coil 202 caused by stray flux. Similarly, driven coil 204 can include a separate connection that couples the driven coil 204 to the active circuit. This connection can carry a current through driven coil 204 to generate an opposing magnetic field that cancels the stray flux.

Figure 3:
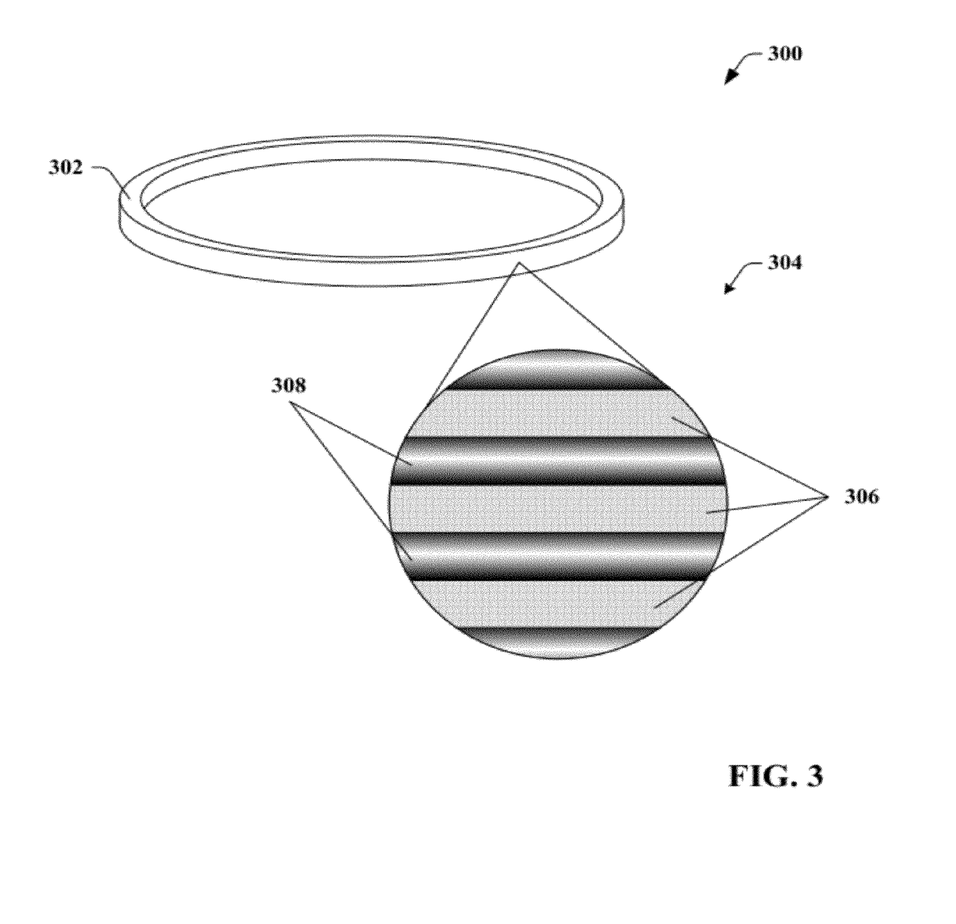
FIG. 3 illustrates an example coil assembly that includes two coils in a bifilar configuration according to one or more aspects.

Turning to FIG. 3, illustrated is an example coil assembly 300 that includes two coils in a bifilar configuration according to one or more aspects. Coil assembly 300 can include a coil structure 302 comprised of a conductor wrapped around upon itself to form a ring. It is to be appreciated that coil structure 302, while depicted as a ring, can be formed to resemble substantially any enclosed shaped. Magnified view 304 depicts a detailed illustration of coil structure 302. As shown in magnified view 304, coil structure 302 includes two distinct conductors (e.g., wires) 306 and 308 in parallel. Conductors 306 and 308 can be wound in parallel (e.g., bifilar) to construct coil structure 302. In accordance with an aspect, conductors 306 and 308 can respectively form the sensing coil and driven coil described supra.

Figure 4:
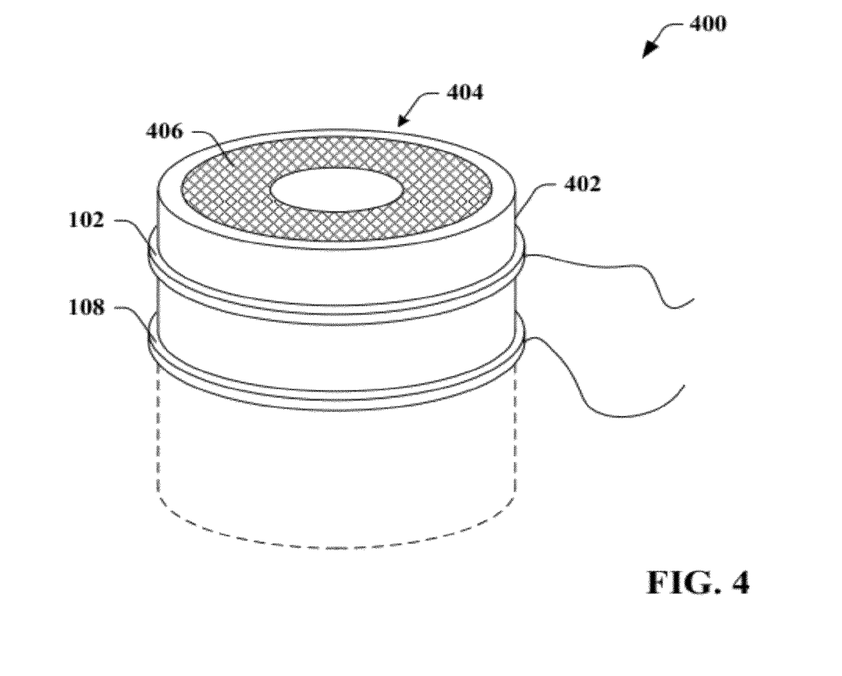
FIG. 4 illustrates an example coil assembly installed on a pot core of an inductive proximity sensor according to one or more aspects.

Turning to FIG. 4, illustrated is an inductance proximity sensor 400 in which a coil assembly is installed on the inductive proximity sensor 400 in accordance with an aspect. FIG. 4 depicts a partial portion of the inductive proximity sensor 400. In particular, FIG. 4 depicts an interior structure 402 of the inductive proximity sensor 400 absent an outer housing. A top portion of the interior structure 402 includes a pot core 404. The pot core 404, in an example, is substantially circular structure with an internal hollow that accommodates a coil 406. The pot core 404, coupled with coil 406, generates a magnetic field when a current runs through the coil 406. The magnetic field is employed to detect target metal objects entering within proximity of the sensor 400. The magnetic field interacts with target metal, creates eddy currents in the target metal, and the eddy currents, in turn, provide a magnetic field that dampens the magnetic field of the pot core 404. The damping of the magnetic field of the pot core 404 loads a tank circuit generating power loss. The power loss can be measured to determine whether target detection occurs.

Pot core 404 can occupy a top portion of interior structure 402, but not extend through a full length of the interior structure 402 (or the inductive proximity sensor 400). The remainder of the interior structure 402 can comprise a material that is inert, magnetically. Thus, the interior structure 402 other than pot core 404 and coil 406 does not impact sensitivity of the sensor 400. Other metal (e.g., mounting surfaces) to the sides of and/or behind the sensor 400, however, can introduce a load on the tank circuit of sensor 400, which, in turn, reduces sensitivity and sensing distance of sensor 400.

A sensing coil 102 can be fitted around the interior structure 402 of sensor 400. Sensing coil 102 can be placed around the portion of the interior structure 402 occupied by the pot core 404. In another example, sensing coil 102 can be located below the portion of the interior structure 402 occupied by the pot core 404, either directly beneath or at a larger distance beneath the pot core 404. The sensing coil 102, as described above, detects stray flux escaping from the sides and/or back of pot core 404. In particular, stray flux, which encircles sensing coil 102, generates an electromotive force in sensing coil 102. When sensing coil 102 is coupled to a circuit, such as an active circuit described above, the electromotive force generates a current. The active circuit analyzes the current and produces a complementary current that drives a driven coil 108 also fitted around the interior structure 402. The driven coil 108 can be placed around the pot core 404 or below the pot core 404. In addition, the driven coil 108 can be adjacent to sensing coil 102 with no separation therebetween or the driven coil 108 and sensing coil 102 can be placed around the interior structure 402 such that a relatively larger separation exists between the coils. The driven coil 108, when driven, produces a complementary magnetic field that operates to cancel the stray flux.

Figure 5:
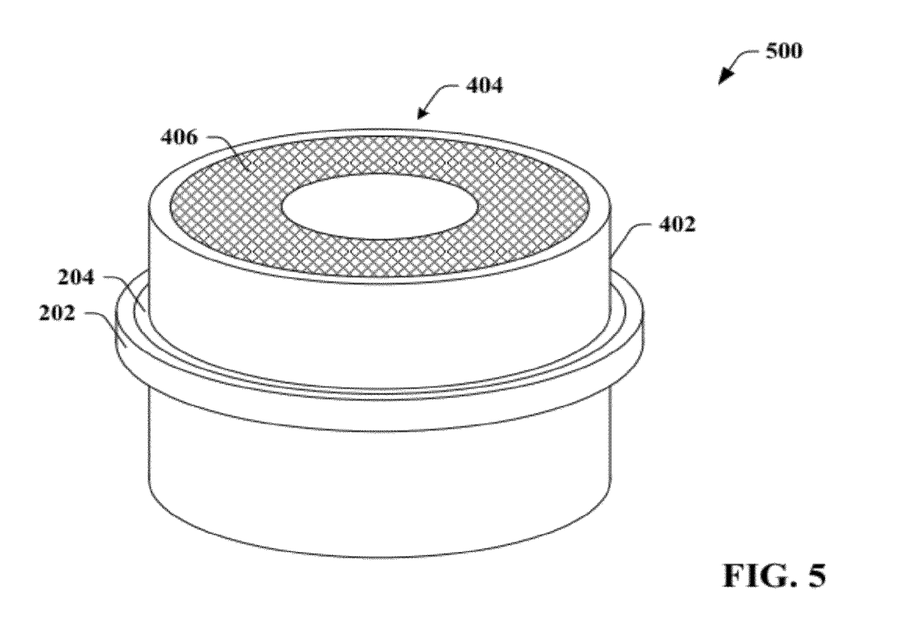
FIG. 5 illustrates an example coil assembly coupled to a pot core of an inductive proximity sensor in accordance with various aspects.
Figure 6:
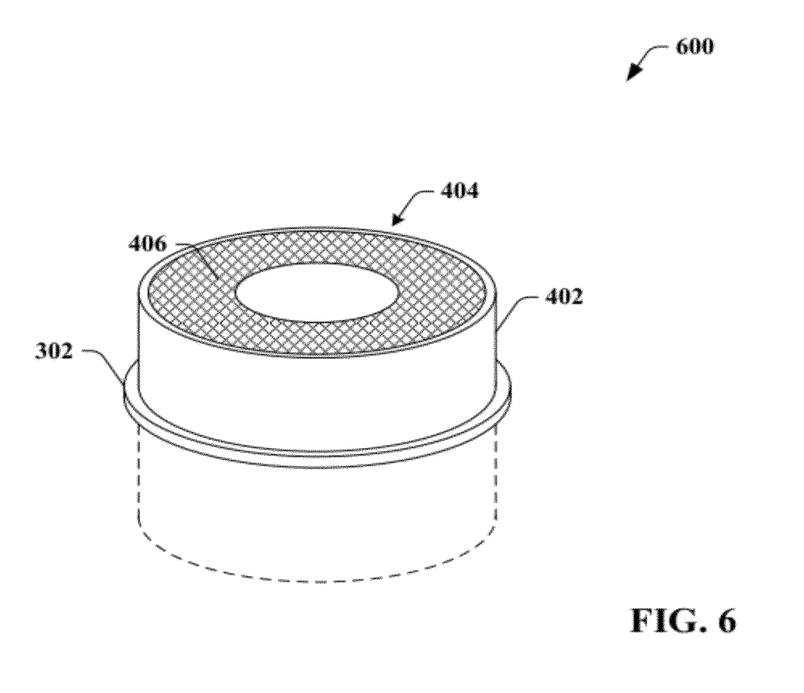
FIG. 6 illustrates an example coil assembly coupled to a pot core of an inductive proximity sensor in accordance with various aspects.

FIG. 5 illustrates a sensor 500 with a coil assembly installed according to an alternative configuration. As depicted in FIG. 5, the coil assembly can include a sensing coil 202 and a driven coil 204 concentrically placed with respect to one another as described supra with regard to FIG. 2. The concentric coils can be placed around the interior structure 402, either at the portion occupied by pot core 404 or beneath pot core 404. In FIG. 6, a sensor 600 is illustrated in which a coil assembly is installed according to yet another configuration. As depicted in FIG. 6, the coil assembly includes coil structure 302 as described above with respect to FIG. 3. In particular, coil structure 302 is a bifilar coil with a sensing coil and a driven coil wound in parallel. Coil structure 302 can be placed around the portion of the interior structure 402 occupied by the pot core 404. In another example, coil structure 302 can be located below the portion of the interior structure 402 occupied by the pot core 404. For instance, the coil structure 302 can be directly beneath or at a larger distance beneath the pot core 404.

Figure 7:
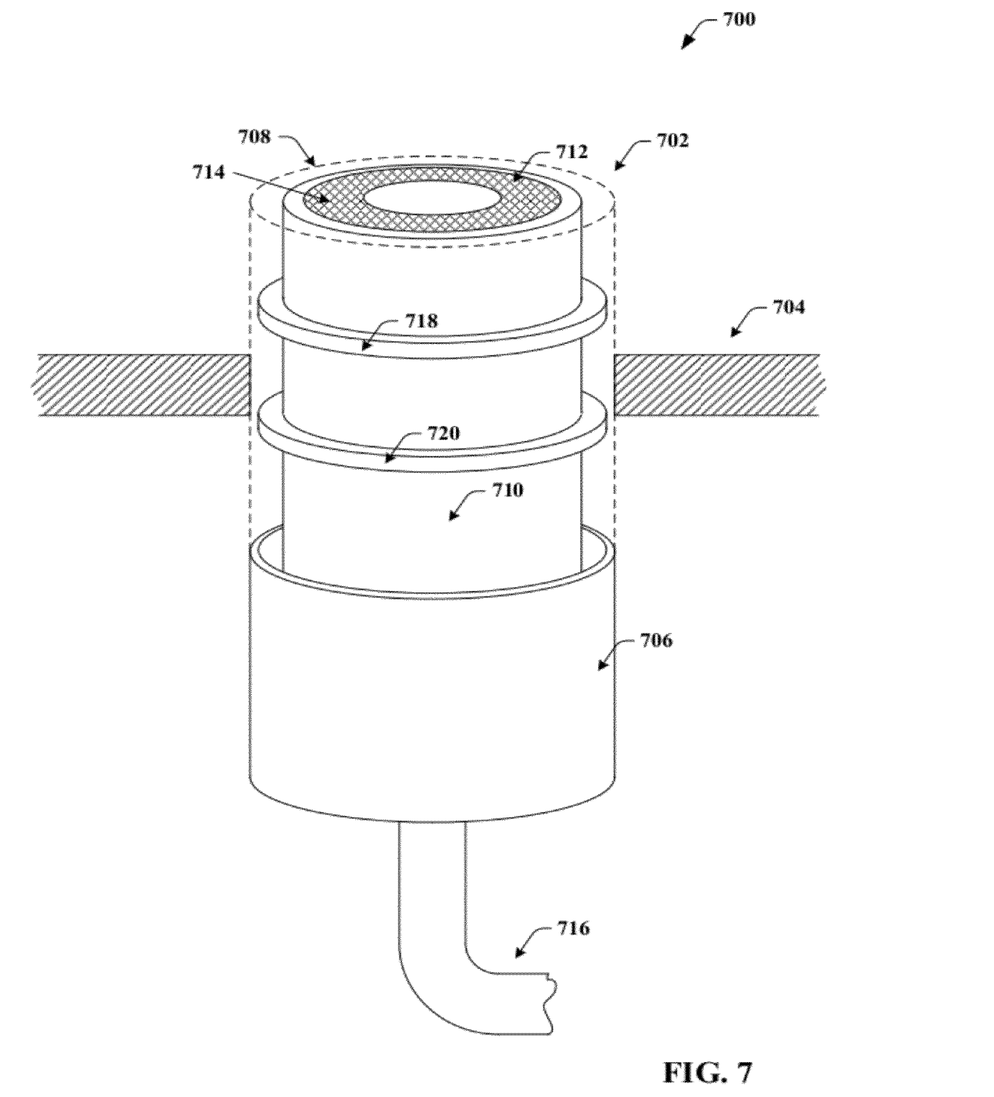
FIG. 7 illustrates an example inductive proximity sensor in accordance with various aspects.

Turning to FIG. 7, a system 700 that includes an inductive proximity sensor 702 mounted in a mounting surface 704 is illustrated in accordance with one or more aspects. Sensor 702 includes a housing 706 terminated at a top portion with a cap 708 (shown in cutaway). In one example, housing 706 is metallic while cap 708 can include a plastic compound. It is to be appreciated that cap 708 can extend across an entirety of an end portion of sensor 702 or can span across only a portion thereof. While sensor 702 is depicted having a cylindrical or tubular shape, it is to be appreciated that sensors having different form factors can be adapted to employ aspects described herein. In addition, sensor 702 can be a shielded proximity sensor or an unshielded proximity sensor. Aspects described herein can be employed with either shielded or unshielded sensors. However, it is to be appreciated that a greater amount of magnetic flux can escape unshielded sensor configurations, thus leading to more unwanted interactions occurring with surrounding metal and resulting in greater gain in cancellation of the magnetic flux. Further, it is to be appreciated that the claims appended hereto are not limited to tubular sensors as depicted in FIG. 7, as it is contemplated that aspects can be adapted to other sensors types such as box-shaped, ring-shaped, etc.

Sensor 702 includes an interior structure 710 within housing 706. The interior structure 706 can include a tank circuit (not shown) connected to a pot core 712 holding a coil 714. The pot core 712 and coil 714, typically, occupies a top portion of interior structure 710 beneath cap 708. Interior structure 710 can also include a detection circuit (not shown) that detects a load on the tank circuit (e.g., a loss of power) and outputs a detection signal when the load (or power loss) exceeds a pre-configured threshold. The detection signal can be output on cable 716 to a controller or other system utilizing sensor 702 for proximity detection and/or safety functions.

According to an example, the tank circuit drives an alternating (AC) current through coil 714 to generate an alternating magnetic field which is enhanced by pot core 712. The flux lines emanate from a front of a center post of the pot core 712 and terminate on a front edge, sides, and/or rear of the pot core 712, in the absence of shielding. A target entering within the magnetic field loads the tank circuit to create damping and/or a loss of power in the tank circuit. The detection circuit can monitor the damping and signal detection when the damping exceeds a pre-configured threshold. The flux lines emanating from the sides contribute to greater sensitivity of unshielded types of sensors, such as sensor 702 illustrated in FIG. 7, but flux from the rear and sides can also interact with the housing 706 and the mounting 704 below the cap 708. In a shielded type of sensor, the stray flux lines interact undesirably with the housing 706 and/or the mounting metal 704 while contributing nothing to a target sensitivity of the sensor.

In an aspect, stray flux escapes to the back and/or sides of pot core 712. The stray flux can pass through surrounding metal such as mounting surface 704. Due to resistance of mounting surface 704, the interaction of the stray flux with mounting surface 704 produces a load on the tank circuit similar to the load caused by a detected target. To distinguish surrounding metal, such as mounting surface 704, from a target, the pre-configured threshold can be calibrated to account for power dissipation from the interaction between the stray flux and mounting surface 704.

However, common industry practice is to specify sensors that work in a range of mounting configurations (e.g., from virtually no mounting metal to a mounting surface flush with the forward edge of housing). In addition, such industry practice typically specifies a variation of no more than +/−10% in target sensing distance with the variations in mounting configuration, as compared to a measurement made in air with no mounting metal. Thus, simple calibration to cancel out the effects of surrounding metal can be difficult. The effect of the housing can be calibrated against, but only imperfectly, due to temperature variations in the permeability of the core (affecting the amount of stray flux) and the loss in the housing (due to variations in resistivity with temperature). In addition, any additional undesired damping reduces a percentage change in damping caused by a target, thus placing greater demands on sensitivity and stability of circuitry of a sensor. As a consequence, the sensitivity and/or sensing distance, with respect to a target, of sensor 702 is reduced because the target must create a higher load to exceed the higher threshold (e.g., the target must move closer to sensor 702). In addition, the resistance of mounting surface 704 can vary with temperature. Accordingly, the load on the tank circuit due to the mounting surface 704 can also vary with temperature.

A small gap can exist between interior structure 710 and housing 706. The small gap offers clearance for a coil assembly 718 to be fitted around interior structure 710. The coil assembly 718 can include two coils—a sensing coil and a canceling coil—wound in a bifilar manner. The sensing coil of coil assembly 718 detects the stray flux. In particular, the coil assembly 718 can be placed such that a majority, if not all, of the stray flux encircles coil assembly 718. When the stray flux encircles coil assembly 718, a voltage electromotive force is generated and fed into an active circuit (not shown). The active circuit generates a canceling current, which is pushed into the canceling coil of coil assembly 718. The canceling current in the canceling coil generates a magnetic field that counteracts the stray flux.

In accordance with another aspect, a second coil assembly 720 can be constructed around sensor 702 similarly to coil assembly 718. Second coil assembly 720 can include a respective sensing coil and canceling coil. In addition, second coil assembly 720 can be coupled to a respective active circuit. Second coil assembly 720 can operate in conjunction with coil assembly 718 to further cancel stray flux from pot core 712 and coil 714. For example, the coil assemblies 718 and 720 can be located with respect to one another to reduce a greater portion of stray flux than a single assembly operating solo. For example, absent coil 720, some stray flux can emerge from the rear of the pot core 712, travel through air towards the front of the assembly, where a canceling action of coil 718 would force it to curve back in and pass inwardly through coil 718. This effect occurs since the net flux passing through coil 718 is zero, so any flux emanating from the pot core 712 forward or rearward of coil 718, terminates back at the pot core 712 forward or rearward, respectively, of coil 718. Absent coil 720, some stray flux that exits and re-enters the pot core 712 below coil 718 would interact with the housing 706 and/or mounting surface 704 located rearward of pot core 712. While FIG. 7 only depicts two coil assemblies (e.g., coil assembly 718 and second coil assembly 720), it is to be appreciated that a multiplicity of coils (e.g., two or more coils), individually coupled to active circuits, can be employed to cancel stray flux. It should be further appreciated that increasing a separation between pot core 712, the mounting surface 704, and/or the housing 706, will reduce such interaction. For instance, a shallower pot core can be employed which does not extend as far rearward from a front face of sensor 702.

Figure 8:
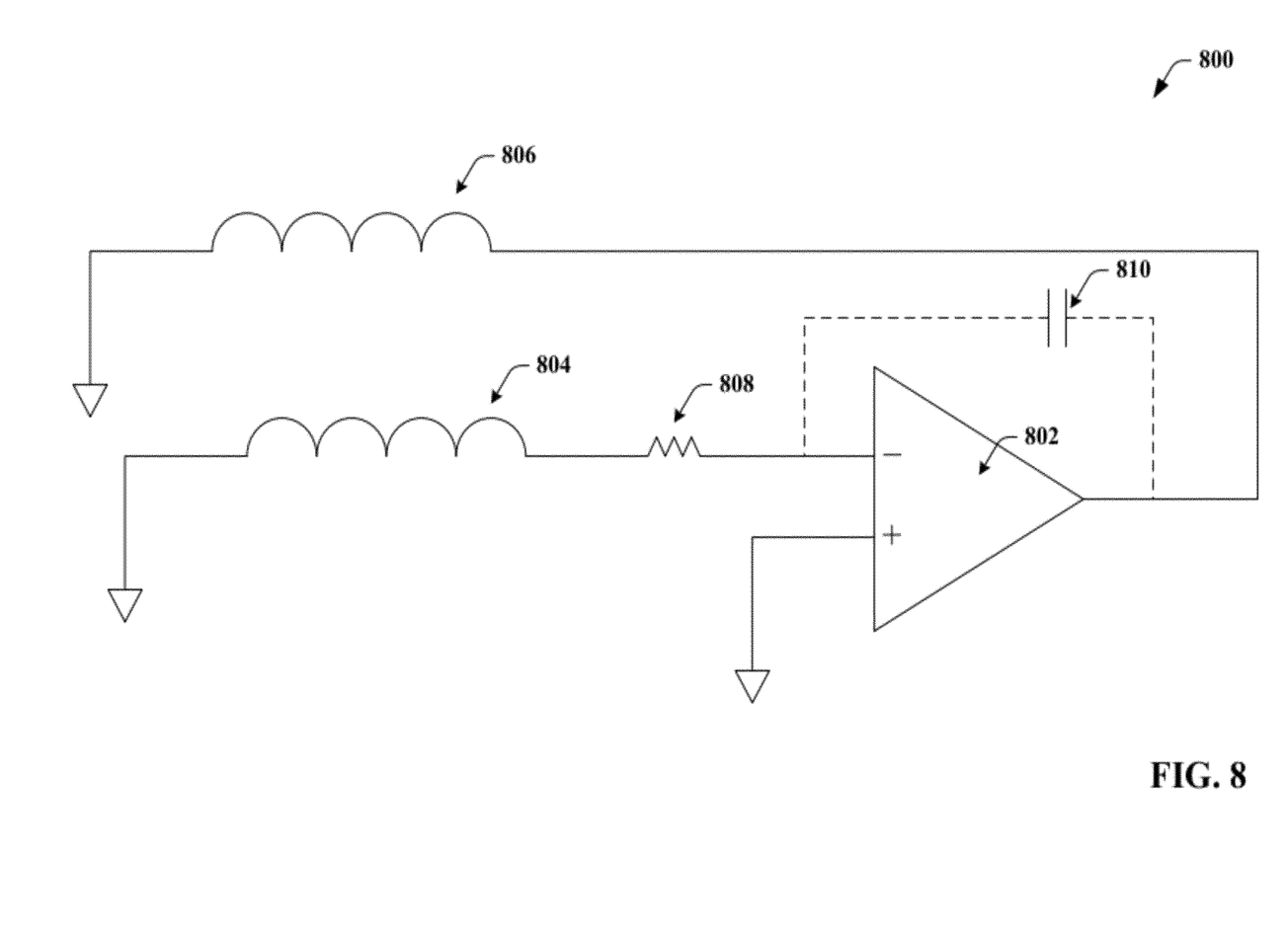
FIG. 8 illustrates an example active circuit in accordance with various aspects.

Turning to FIG. 8, an example active circuit 800 is illustrated in accordance with various aspects. Active circuit 800 can be employed to implement active circuit 106 described above with respect to FIG. 1. In an aspect, active circuit 800 facilitates canceling stray flux detected by a sensing coil placed around a pot core of an inductive proximity sensor.

Active circuit 800 can include an operational amplifier (op amp) 802 that generates an output capable of driving a coil to cancel stray flux. A non-inverting input of op amp 802 can couple to ground, while an inverting input of op amp 802 connects to a sensing coil 804. In an example, sensing coil 804 can be similar to sensing coil 102, sensing coil 202, or the sensing coil portion of coil assembly 302. In an aspect, sensing coil 804 fits around a pot core of an inductive proximity sensor such that stray flux escaping from the sides and/or back of the pot core encircles sensing coil 804. The stray flux generates an electromotive force (e.g., an input voltage) in sensing coil 804. Sensing coil 804, in addition to being coupled to op amp 802, can also be tied to ground.

The input voltage generated in sensing coil 804 by stray flux feeds into the inverting input of op amp 802. Op amp 802, in turn, produces an output voltage. In an aspect, the output voltage is equal to a difference between a voltage at the non-inverting input and a voltage at the inverting input, wherein the difference is multiplied by a gain of op amp 802. As the non-inverting input of op amp 802 is tied to ground (e.g., voltage of zero), the output voltage of op amp 802 becomes the inverse of the voltage at the inverting input multiplied by the gain. Accordingly, the output voltage of op amp 802 is an amplified inverse of the input voltage from sensing coil 804.

The output of op amp 802 couples to a driven coil 806. In an example, the driven coil 806 can be similar to driven coil 108, driven coil 204, or the driven coil portion of coil assembly 302. In an aspect, driven coil 806, similar to sensing coil 804, can be placed around the pot core of the inductive proximity sensor. Driven coil 806 can be a separate and distinct coil from sensing coil 804, concentrically placed with respect to sensing coil 804, or bifilar (e.g., wound in parallel) with sensing coil 804. Op amp 802 feeds the output voltage into driven coil 806 which, when the voltage is applied, generates a magnetic field operable to cancel the stray flux detected by sensing coil 804. According to another aspect, active circuit 800 can include an optional resistor 808 in series with sensing coil 804 and the inverting input of op amp 802. In addition, active circuit can also include a capacitor 810 in parallel with op amp 802. In particular, the capacitor 810 is in parallel with the inverting input and the output of op amp 802 and operates as a feedback mechanism.

Those skilled in the art will know that coils 804 and 806 in FIG. 8 may not couple perfectly. For example, there can be some equivalent leakage inductance. The leakage inductance can introduce some high-frequency roll-off and phase shift in the feedback path, which can produce instability. Capacitor 810 and resistor 808 can be employed to eliminate such spurious oscillation. However, it is to be appreciated that a resistance of coil 804 itself can be sufficient to render resistor 808 unnecessary. In an particular example, where op amp 802 is a TLC072 type (10 MHz GBW), a capacitor of a non-critical value in the range of about 10 pF to 47 pF suppressed oscillation with no effect on the operation of the circuit. The resistance of the coil 804, at approximately 50 ohms, renders the resistor 808 unnecessary. However, it is to be appreciated that the type of op-amp, type of capacitor, type of resistor, and/or necessity of such capacitors and resistors can vary depending on characteristics of the coils and/or cancellation requirements.

Those skilled in the art will understand that coils 804 and 806 can be less tightly coupled if fabricated as adjacent coils as in FIG. 2 rather than true bifilar windings as in FIG. 3. Those skilled in the art will understand that this could necessitate a more precisely engineered feedback compensation network to prevent oscillations, which can be justified by easier fabrication of the non-bifilar windings.

With the polarity of coils 804 and 806 as shown in FIG. 8, the feedback is negative and, accordingly, the feedback loop can be made stable. It is to be appreciated that the (−) and (+) inputs of op amp 802 can be swapped, and, further, the polarity of either coil 804 or coil 806 can also be swapped such that the feedback would continue to be negative and stable. However, as depicted in FIG. 8 an inter-winding capacitance between coils 804 and 806 need not be charged or discharged, whereas in the alternate configuration the error signal and resulting feedback signal would tend to charge/discharge such parasitic capacitances. This can lead to a stronger pole, rolloff and/or phase shift in the feedback loop due to an equivalent leakage inductance in series with coils 804 and 806.

It is to be appreciated that other alternative feedback circuits can be employed to accomplish the same function as achieved by the circuit shown in FIG. 8.

Figure 9:
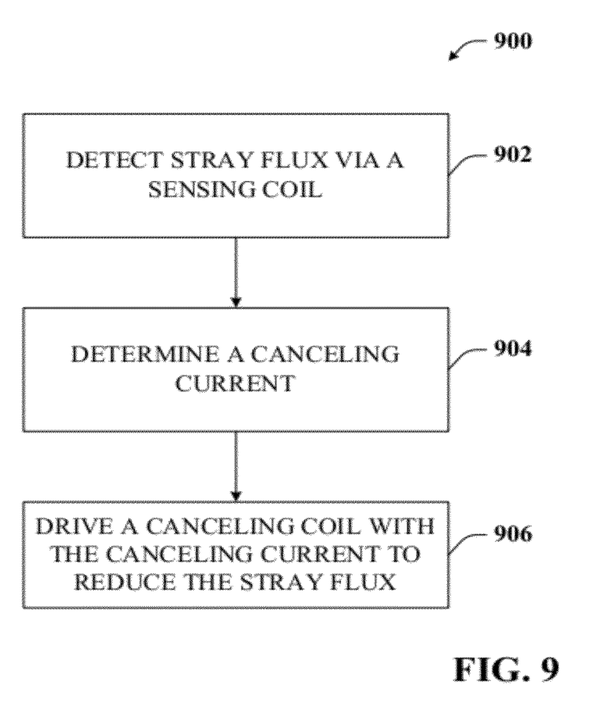
FIG. 9 is a flow diagram of an example methodology for reducing stray flux of an inductive proximity sensor.

FIG. 9 illustrates an example methodology for canceling stray flux to improve sensitivity and sensing distance of an inductive proximity sensor. While, for purposes of simplicity of explanation, the processes or methodologies are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Referring to FIG. 9, a method 900 for reducing stray flux of an inductive proximity sensor is illustrated. In an example, method 900 can be employed by an inductive proximity sensor, such as sensor 702, to cancel stray flux that reduces sensitivity and sensing distance with respect to a target. At reference numeral 902, stray flux is detected via a sensing coil. The sensing coil can be wound around a pot core of an inductive proximity sensor. Stray flux escaping through the back or sides of the pot core encircles the sensing coil to generate an electromotive force therein, thus detecting the stray flux.

At reference numeral 904, a canceling current is determined. In an example, the electromotive force can be input into an active circuit that generates an appropriate output voltage based upon the magnitude and sign of the electromotive force. The output voltage, when the active circuit is coupled to a coil, drives the canceling current through the coil. At reference numeral 906, the canceling current is driven through a canceling current to reduce the stray flux. The canceling current is associated with an output voltage identified to generate a magnetic field opposing the stray flux.

It is to be appreciated that a current, proportional to the sensor current, can be driven through a coil around the port core as an alternative to aspects described above. The current, in an example, can be equivalent to the current that the active circuit described above would generate. However, the amount of stray flux varies with a reluctance of space surrounding the sensor, which can vary with the presence of surrounding metals. Accordingly, a fixed current proportional to the sensor current cannot account for such variances in temperature and/or mounting configuration. For instance, the fixed current may be sufficient in a particular configuration at a particular time, however, such a fixed current scheme cannot track variances in surrounding mounting metal caused by variations in mounting configurations. Accordingly, continuous manual calibration steps can be required. With the active circuit and coil assembly described herein, such continuous calibration is unnecessary as the current driven through a cancelling coil is dynamic and tracks changes in surrounding metal, temperature, etc.

In addition, the aspects described above are not dependent on any tightly coupled or engineered values. For instance, an exact number of turns in the sensing and/or driven coils is not critical. In addition, the active circuit described above does not require passive components (e.g., resistors, capacitors, inductors, etc.) having particular or precise values.

As utilized herein, terms "component," "system," "circuit," "sensor," and the like, are intended to refer to a computer-related entity or solid-state electronic, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. In addition, a component can be hardware or solid state electronic such as an electronic circuit, a semiconductor device, etc.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. An inductive proximity sensor, comprising:
   a core housing a first coil;
   a tank circuit coupled to the first coil, wherein the tank circuit and first coil are configured to generate a first magnetic field;
   a sensing coil, wound around the core, configured to detect stray flux of the first magnetic field;
   an active circuit configured to generate a canceling current based upon an input provided by the sensing coil; and
   a driven coil configured to generate a second magnetic field in accordance with the canceling current, wherein the second magnetic field operates to cancel the stray flux.

2. The inductive proximity sensor of claim 1, wherein the sensing coil and driven coil are distinct and separate coils.

3. The inductive proximity sensor of claim 1, wherein the sensing coil and the driven coil are concentrically located with respect to one another.

4. The inductive proximity sensor of claim 1, wherein the sensing coil and the driven coil are bifilar.

5. The inductive proximity sensor of claim 1, wherein the stray flux emanates from at least one of the sides or back of the core.

6. The inductive proximity sensor of claim 1, wherein the active circuit comprises an operational amplifier configured to generate an output voltage based upon a voltage generated in the sensing coil due to the stray flux.

7. The inductive proximity sensor of claim 6, wherein the operational amplifier is coupled to the driven coil to generate the canceling current based upon the output voltage.

8. The inductive proximity sensor of claim 6, wherein the sensing coil is coupled to an inverting input of the operational amplifier and a non-inverting input of the operational amplifier is tied to ground.

9. The inductive proximity sensor of claim 8, wherein the active circuit further comprises a resistor in series with the sensing coil and the inverting input.

10. The inductive proximity sensor of claim 6, wherein the active circuit further comprises a capacitor in parallel with the operational amplifier.

11. The inductive proximity sensor of claim 1, further comprising:
   a plurality of sensing coils;
   a plurality of driven coils; and
   a plurality of active circuits.

12. The inductive proximity sensor of claim 11, wherein each sensing coil of the plurality of sensing coils is respectively and uniquely associated with one driven coil of the plurality driven coils and one active circuit of the plurality of active circuits.

13. A method of reducing stray flux of an inductive proximity sensor, comprising:
   detecting stray flux from a core of the inductive proximity sensor via a sensing coil;
   generating a canceling current based upon a magnitude of the stray flux detected by the sensing coil; and
   driving a canceling coil with the canceling current to generate a magnetic field operable to cancel the stray flux.

14. The method of claim 13, wherein the canceling coil and the sensing coil are bifilar wound.

15. The method of claim 13, wherein the canceling current is based upon an electromotive force that builds in the sensing coil due to the stray flux.

16. The method of claim 15, wherein the canceling current is based upon an inverted amplification of the electromotive force.

17. The method of claim 13, further comprising detecting the stray flux from the core via a multiplicity of sensing coils.

18. The method of claim 17, further comprising generating a multiplicity of canceling currents based upon detections by the multiplicity of sensing coils.

19. The method of claim 18, further comprising driving a multiplicity of canceling coils with the multiplicity of canceling currents.

20. A device for canceling stray flux of an inductive proximity sensor, comprising:
   means for detecting a magnitude of stray flux emanating from the inductive proximity sensor;
   means for determining a canceling current based upon the magnitude of stray flux; and
   means for generating a magnetic field based upon the canceling current, wherein the magnetic field operates to cancel the stray flux.

* * * * *